(12) United States Patent
Acar et al.

(10) Patent No.: US 7,109,274 B2
(45) Date of Patent: Sep. 19, 2006

(54) POLYARYLATE COMPOSITIONS

(75) Inventors: Ali Ersin Acar, Clifton Park, NY (US);
Paul Dean Sybert, Evansville, IN (US);
Xiangyang Li, Mt. Vernon, IN (US);
Karthik Balakrishnan, Evansville, IN (US); Gregory Allen O'Neil, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 169 days.

(21) Appl. No.: 10/881,957

(22) Filed: Jun. 28, 2004

(65) Prior Publication Data

US 2006/0004152 A1    Jan. 5, 2006

(51) Int. Cl.
*C08L 67/03* (2006.01)
*C08L 69/00* (2006.01)

(52) U.S. Cl. .............. 525/439; 525/133; 525/424; 525/444

(58) Field of Classification Search ............. None
See application file for complete search history.

(56) References Cited

U.S. PATENT DOCUMENTS

| | | | |
|---|---|---|---|
| 4,379,892 A | 4/1983 | Ueno et al. | |
| 5,916,997 A | 6/1999 | Webb et al. | |
| 6,143,839 A | 11/2000 | Webb et al. | |
| 6,559,270 B1 * | 5/2003 | Siclovan et al. | ............ 528/196 |
| 6,572,956 B1 | 6/2003 | Pickett et al. | |
| 2002/0060309 A1 * | 5/2002 | Jester | .................... 252/299.01 |

FOREIGN PATENT DOCUMENTS

EP    0 261 869    3/1988

OTHER PUBLICATIONS

He; Microstructure Formation in Polyblends Containing Liquid Crystal Polymers; POLYMER 35(23); 1994, p. 5061-5066.*
PCT International Search Report, dated Sep. 27, 2005.

* cited by examiner

*Primary Examiner*—David J. Buttner
(74) *Attorney, Agent, or Firm*—Andrew J. Caruso; William E. Powell, III

(57) ABSTRACT

The present invention relates to a polymer composition comprising a transparent polymer blend. The polymer blend comprises a first resin and a second resin. The first resin comprises polyarylate structural units of formula I, wherein $R^1$ is independently at each occurrence a $C_1$–$C_2$ alkyl group, or a halogen atom, and p is 0 to 3. The second resin is selected from the group consisting of polycarbonates, polyarylates and copolyestercarbonates. The first resin and the second resin are further characterized by a difference in polyarylate structural unit content, said difference being less than about 40 mole percent.

24 Claims, No Drawings

POLYARYLATE COMPOSITIONS

BACKGROUND OF THE INVENTION

This invention relates to polymer compositions comprising transparent polymer blends, methods for their preparation, and articles made therefrom.

Polycarbonates and polyesters, especially poly(alkylene dicarboxylates) (e.g. poly(ethylene terephtahlate) and poly(butylene terephtahlate), and blends thereof are widely employed classes of materials, in part because of their excellent physical properties. However, long term color stability among polycarbonates, polyesters, poly(alkylene dicarboxylates), and blends thereof remains a persistent problem. Color instability is evidenced by yellowing, and loss of transparency and attractiveness of molded articles comprising such polymers. Loss of gloss can also be an undesirable long term phenomenon. In addition, if selected for use in certain applications such as automotive body panels, polycarbonates, polyesters, poly(alkylene dicarboxylates), and blends thereof must display toughness in impact tests while retaining heat resistance up to a minimum of about 80° C. and adequate injection moldability.

Yellowing of polycarbonates and polyesters is caused largely by the action of ultraviolet radiation, which is why such yellowing is frequently designated "photoyellowing". Numerous means for suppressing photoyellowing in polycarbonate-containing materials have been employed. The most common method for suppressing photoyellowing is by adding one or more ultraviolet absorbing compounds (UVA's). For the most part, UVA's are low molecular weight compounds, which must be employed at relatively low levels, typically below 1% by weight, to avoid degradation of such physical properties of the polymer as impact strength and heat distortion temperature. Another method for suppressing photoyellowing comprises blending other polymers with polycarbonates and/or polyesters to improve their resistance to degradation by ultraviolet radiation and to retard loss of gloss. The resistance of a material to photodegradation and loss of gloss is collectively designated "weatherability". Examples of "weatherable" blends include blends of polycarbonates with copolyesters, wherein the copolyesters comprise "resorcinol iso/terephthalate" structural units (See structure I below), optionally in combination with "soft block" ester units derived, for example, from an aliphatic or alicyclic dihydroxy compound or dicarboxylic acid as described in U.S. Pat. No. 6,143,839. Unfortunately, such weatherable blends are typically immiscible. Therefore their use is often limited to situations in which transparency is not required. Another concern common to organic polymers is their susceptibility to attack by organic liquids, a limitation which affects the uses to which such polymers may be put.

Because of the above-mentioned problems and limitations, it is of interest to produce a wider variety of weatherable and weatherability-improving compositions. It remains of interest, therefore, to develop new polymer compositions that can be employed to make molded articles or films which display both resistance to photodegradation as well as enhanced chemical resistance. Specifically, it would be desirable to find compositions having polycarbonate-like toughness and moldability, while simultaneously possessing good resistance to degradation by certain chemicals, and excellent weatherability. It would further be desirable if such compositions were to retain their desirable transparency and surface gloss characteristics over an extended time period.

SUMMARY OF THE INVENTION

In one aspect the present invention relates to a polymer composition comprising a transparent polymer blend. The transparent polymer blend comprises a first resin and a second resin. The first resin comprises polyarylate structural units of formula I

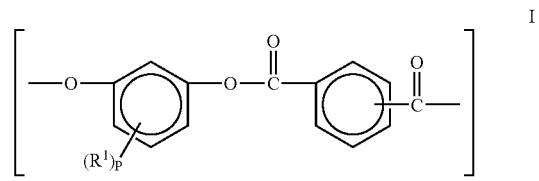

wherein $R^1$ is independently at each occurrence a $C_1$–$C_{12}$ alkyl group, or a halogen atom, and p is 0 to 3. The second resin is selected from the group consisting of polycarbonates, polyarylates and copolyestercarbonates. The second resin optionally comprises polyarylate structural units I. The polyarylate structural units of resin 1 and optionally of resin 2 are present in an amount corresponding to a mole percentage of the total repeat units of the first resin and a mole percentage of the total repeat units of the second resin. The first resin and the second resin are further characterized by a difference in polyarylate structural unit content. The difference in polyarylate structural unit content is determined by subtraction of the mole percentage of polyarylate structural units in the second resin from the mole percentage of polyarylate structural units in the first resin. Among compositions of the present invention the difference in polyarylate structural unit content is less than about 40 mole percent. The transparent polymer blend may also contain additional resin components. Where additional resin components are present the requirement that the difference in the polyarylate structural content be less than about 40 mole percent applies to the two resins (denominated "resin 1" and "resin 2") in the polymer blend for which the difference in polyarylate structural unit content is smallest.

In another aspect the present invention provides a method of preparing novel polymer blends consisting of a first resin comprising polyarylate structural units I and a second resin optionally comprising polyarylate structural units, and wherein the difference in polyarylate structural unit content of the first and second resins is less than about 40 mole percent.

In yet another aspect, the present invention provides weatherable articles comprising the novel polymer blends disclosed herein.

DETAILED DESCRIPTION

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term polyarylate includes polymers comprising polyarylate structural units, for example polyarylate structural units having structure I. The term therefore includes copolyestercarbonates comprising structural units derived from an aromatic diacid or an aromatic diacid derivative.

The term "alkyl" as used in the various embodiments of the present invention is intended to designate normal alkyl, branched alkyl, aralkyl, cycloalkyl, and bicycloalkyl radicals. In various embodiments normal and branched alkyl radicals are those containing from 1 to about 12 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments cycloalkyl radicals are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those containing from 6 to 18 ring carbon atoms. Some illustrative non-limiting examples of these aryl radicals include phenyl, biphenyl, and naphthyl.

As used herein the term "aromatic radical" refers to a radical having a valence of at least one and comprising at least one aromatic ring. Examples of aromatic radicals include phenyl, pyridyl, furanyl, thienyl, naphthyl, phenylene, and biphenyl. The term includes groups containing both aromatic and aliphatic components, for example a benzyl group, a phenethyl group or a naphthylmethyl group. The term also includes groups comprising both aromatic and cycloaliphatic groups for example 4-cyclopropylphenyl and 1,2,3,4-tetrahydronaphthalen-1-yl.

As used herein the term "aliphatic radical" refers to a radical having a valence of at least one and consisting of a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one and comprising an array of atoms which is cyclic but which is not aromatic, and which does not further comprise an aromatic ring. The array may include heteroatoms such as nitrogen, sulfur and oxygen or may be composed exclusively of carbon and hydrogen. Examples of cycloaliphatic radicals include cyclopropyl, cyclopentyl cyclohexyl, 2-cyclohexylethy-1-yl, tetrahydrofuranyl and the like.

In various embodiments the polymer compositions of the present invention are transparent, non-ghosting materials, which are thermally stable. A polymer composition is transparent under the context of this invention when the percentage transmission is greater than or equal to 25% as measured by ASTM D1003. A polymer blend is transparent under the context of this invention when the percentage transmission is greater than or equal to 60% as measured by ASTM D1003. Non-ghosting within the context of the present invention means that films or parts prepared from the composition do not exhibit "ghosting", that is the films are free of haziness apparent to the human eye when the film is looked through. The polymer compositions of the present invention typically comprise a two component blend consisting of a first and second resin, said two component blend being "transparent" as defined above for the polymer compositions of the present invention. Typically, a part or a film prepared from the two component polymer blend will appear to be transparent to the human eye when the film or part is looked through at various angles of observation.

Thermal stability within the context of the present invention refers to resistance of a polymer to molecular weight degradation when the polymer is heated to form a polymer melt. Thus, a polymer with poor thermal stability shows significant molecular weight degradation under "thermal conditions", such as during extrusion, molding, thermoforming, hot-pressing, and like conditions. Molecular weight degradation may also be manifested through color formation and/or in the degradation of other properties such as weatherability, gloss, mechanical properties, and/or thermal properties. Molecular weight degradation can also cause significant variation in processing conditions as the melt viscosity of the polymer blend changes.

As noted, the present invention relates to a polymer composition comprising a polymer blend, the polymer blend comprising a first resin comprising structural units of the formula I, and a second resin. The second resin is selected from the group consisting of polycarbonates, polyarylates and copolyestercarbonates, the second resin optionally comprising polyarylate structural units I.

The "polyarylate structural units" of the first and optionally the second resin are present in an amount corresponding to a mole percentage of the total repeat units present in the resin.

A key aspect of the present invention is that when the "difference in polyarylate structural unit content" expressed as the mole percentage of polyarylate structural units in the first resin minus the mole percentage of polyarylate structural units in the second resin, is less than about 40 percent, the polymer blend exhibits outstanding and surprising physical properties. It should be noted that when the calculated value of the "difference in polyarylate structural unit content" is a negative value, the absolute value of the difference in polyarylate structural unit content should be less than about 40 percent. The polymer blend may contain additional resin components. Where additional resin components are present the difference in the polyarylate structural content being less than about 40 mole percent applies to the closest two resins in the polymer blend. In certain embodiments of the present invention the polymer blend is characterized by a difference in polyarylate structural unit content of less than about 30 mole percent, and more preferably less than about 20 mole percent.

In one embodiment, the present invention provides a polymer composition comprising the transparent polymer blend wherein the first resin comprises polyarylate structural units derived from at least one carbonate block and at least one polyester block with chain members derived from at least one dihydroxy-substituted aromatic hydrocarbon moiety and at least one aromatic dicarboxylic acid moiety. In one particular embodiment the dihydroxy-substituted aromatic hydrocarbon moiety is derived from a 1,3-dihydroxybenzene moiety, illustrated in the structural moiety of formula (II), commonly referred to throughout this specification as resorcinol or resorcinol moiety. In formula (II), $R^1$ is independently at each occurrence a $C_{1-12}$ alkyl or halogen, and p is 0–3. Resorcinol or resorcinol moiety as used within the context of the present invention should be understood to include both unsubstituted 1,3-dihydroxybenzene and substituted 1,3-dihydroxybenzenes unless explicitly stated otherwise.

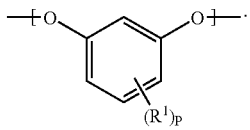

Suitable dicarboxylic acid residues include aromatic dicarboxylic acid residues derived from monocyclic aromatic diacid moieties, including isophthalic acid, terephthalic acid, or mixtures of isophthalic and terephthalic acids, or from polycyclic aromatic diacid moieties. In various embodiments the aromatic dicarboxylic acid residues are derived from mixtures of isophthalic and terephthalic acids as typically illustrated in the structural moiety of formula III. The aromatic dicarboxylic acid residues can be derived from their corresponding acids, acid halides and esters.

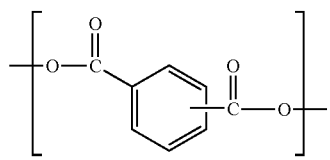

For convenience, polyarylates comprising resorcinol moieties II and iso- and terephthalte moieties III are referred to as "ITR polymers", or simply "ITR's". Therefore, in one particular embodiment, the present invention provides a polymer composition comprising the polymer blend wherein the first resin is an ITR, said ITR, comprising "polyarylate structural units" of formula I, wherein $R^1$ and p are as previously defined.

In an additional embodiment the first resin further comprises structural units of the formula IV,

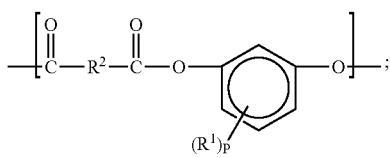

wherein, each $R^1$ is independently at each occurrence a $C_1$–$C_{12}$ alkyl group, or a halogen atom; p is 0 to 3; and $R^2$ is a single bond, a $C_1$–$C_{50}$ divalent aliphatic radical, a $C_3$–$C_{50}$ cycloaliphatic radical, or a $C_4$–$C_{40}$ aromatic radical.

In one particular embodiment the polymer composition of the present invention comprises the polymer blend wherein the first resin has polyarylate structural units V,

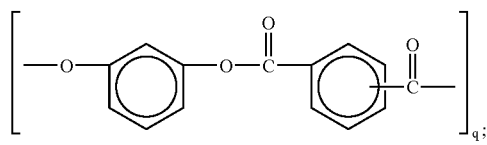

wherein q=2–400, and the second resin is selected from the group consisting of polycarbonates, polyarylates and copolyestercarbonates, said second resin optionally comprising polyarylate structural units I. As in other embodiments, the "polyarylate structural units" of the first and second resins are present in amounts corresponding to a mole percentage of the total repeat units of each of the resins. The first resin and second resin are characterized by a "difference in polyarylate structural unit content", said difference being less than about 40 mole percent. As noted, the "difference in polyarylate structural unit content" can be expressed as the mole percent of polyarylate structural units present in the first resin minus the mole percent of polyarylate structural units present in the second resin.

The "first resin" present in the polymer blends of the present invention is typically a copolyestercarbonate comprising "ITR blocks" and polycarbonate blocks. Such copolyestercarbonates are sometimes referred to as possessing "polyester blocks" which term is used interchangeably with the term "polyarylate blocks". The term "ITR block" refers to a polyarylate block comprising structural units I. The copolyestercarbonates are typically prepared by reacting a hydroxy-terminated polyester intermediate (e.g. a hydroxy-terminated ITR intermediate) with a dihydroxy-substituted aromatic compound (e.g. a bisphenol such as BPA) and phosgene under interfacial conditions. The hydroxy-terminated polyester intermediate can be prepared by methods disclosed in copending U.S. application Ser. No. 10/639,998 filed on Aug. 12, 2003 which is incorporated by reference herein in its entirety.

The hydroxy-terminated polyester intermediate is conveniently prepared by reacting a dihydroxy aromatic compound such as resorcinol with one or more aromatic diacid chlorides (e.g. isophthaloyl dichloride and terephthaloyl dichloride) in a reaction mixture comprising water and at least one organic solvent substantially immiscible with water (i.e. under interfacial conditions). Control of the molecular weight of the hydroxy-terminated polyester may be exerted by increasing the molar ratio of the dihydroxy-substituted aromatic compound to the diacid chloride employed, and by decreasing the amount of water present in the reaction mixture. Enhanced control of the molecular weight of the hydroxy-terminated polyester intermediate may thus be achieved with or without the use of an end-capping agent. Controlling the molecular weight of the hydroxy-terminated polyester intermediate may in certain instances be of importance as it has been discovered that transparent and non-ghosting behavior of the blends of the present invention is related to the "size" or "length" of the polyarylate blocks present in the first and second resins when at least one of the first and second resins is a copolyestercarbonate comprising polyarylate blocks. When the molecular weight of the hydroxy-terminated polyester intermediate exceeds a certain threshold molecular weight value, the polycarbonate and polyarylate blocks of a copolyestercarbonate derived from the hydroxy-terminated polyester intermediate tend to phase separate to such a degree that haze and/or ghosting is observed in films and molded parts comprising such copolyestercarbonates. The onset of haze or ghosting is also related to the relative amounts of the polycarbonate and polyarylate blocks of the copolyestercarbonate.

It is also highly desirable to control the formation of anhydride linkages during the preparation of hydroxy-terminated polyester intermediates used in the preparation of copolyestercarbonates, which may be employed in the blends of the present invention. In hydroxy-terminated polyarylates such as hydroxy-terminated ITR's, anhydride linkages are believed to arise through combination of two isophthalate or terephthalate moieties or mixtures thereof. It is believed that the anhydride linkage represents the weak link in the polyarylate chain, and that anhydride linkages are especially susceptible to cleavage under thermal processing conditions thereby producing shorter chains terminated by acid end-groups. These acid end-groups, in turn, may accelerate the hydrolysis of acid sensitive groups (esters, carbonates) along the polymer backbone, generating additional carboxyl and hydroxyl end-groups, and further contributing to molecular weight degradation, and loss of other desirable properties.

The loss of transparency in compositions (e.g. polymer blends and single polymers) comprising copolyestercarbonates is believed to be a result of the formation of separate domains of polyarylate rich phases and polycarbonate rich phases within the composition. The loss of transparency occurs when these domains are of sufficient size to scatter visible light. (Rayleigh's scattering effect). Hence, the mole percentage of the copolyestercarbonate constituted by polyarylate blocks as well as the length or "molecular weight" of the polyarylate blocks must be carefully controlled in order to preserve transparency of a blend of the present invention or a polymer composition comprising such a blend. Typically, in transparent blends of the present invention the first resin is a copolyestercarbonate comprising structural units having formula I, the copolyestercarbonate is characterized by a polyarylate block length corresponding to a formula weight of from about 500 to about 15000, preferably about 500 to about 5000 grams/mole as measured by gel permeation chromatography using one or more polycarbonate molecular weight standards.

Typically, the first resin, which comprises "polyarylate structural units", as defined above may be obtained by adding a resorcinol moiety to a reaction mixture as an aqueous feed solution, or feed mixture with water comprising at least some un-dissolved resorcinol moiety. In another embodiment a dihydroxy-substituted aromatic hydrocarbon moiety such as a resorcinol moiety may be added to a reaction vessel in a molten state as a step in the formation of the first resin. The discoloration of the mixture is reduced by maintaining a pH about 5 or less in the aqueous solution. Color can be determined by visual observation or by other methods known to those skilled in the art, such as spectroscopic methods. The pH of about 5 or less may be provided in some embodiments using at least one inorganic acid or at least one organic acid, or at least one of an inorganic acid in combination with at least one of an organic acid.

In various embodiments inorganic acids comprise hydrochloric acid, phosphoric acid, phosphorous acid, sulfuric acid, and mixtures thereof. In various embodiments organic acids comprise organic sulfonic acids, methanesulfonic acid, p-toluenesulfonic acid, sulfonic acid-functionalized ion exchange resins, organic carboxylic acids, lactic acid, malic acid, glyceric acid, oxalic acid, malonic acid, succinic acid, glutaric acid, adipic acid, citric acid, tartaric acid, glycolic acid, thioglycolic acid, tartaric acid, acetic acid, halogenated acetic acids like, monochloroacetic acid, dichloroacetic acid, trichloroacetic acid, propionic acid, gluconic acid, ascorbic acid, and mixtures thereof. In some embodiments gluconic acid may be particularly beneficial because of its iron complexing ability and lack of corrosive properties compared to certain other acids. In various embodiments the amount of acid which may be present is in a range of between about 0.1 ppm and about 100,000 ppm.

The first resin may be obtained by combining at least one catalyst with the reaction mixture. The catalyst may be present at a total level in a range of between about 0.1 and about 10 mole % based on total molar amount of diacid groups. Suitable catalysts comprise tertiary amines, quaternary ammonium salts, quaternary phosphonium salts, guanidinium salts, and mixtures thereof. Suitable tertiary amines include triethylamine, dimethylbutylamine, diisopropylethylamine, 2,2,6,6-tetramethylpiperidine, and mixtures thereof. Other contemplated tertiary amines include N—$C_1$–$C_6$-alkyl-pyrrolidines, such as N-ethylpyrrolidine, N—$C_1$–$C_6$-piperidines, such as N-ethylpiperidine, N-methylpiperidine, and N-isopropylpiperidine, N—$C_1$–$C_6$-morpholines, such as N-ethylmorpholine and N-isopropyl-morpholine, N—$C_1$–$C_6$-dihydroindoles, N—$C_1$–$C_6$-dihydroisoindoles, N—$C_1$–$C_6$-tetrahydroquinolines, N—$C_1$–$C_6$-tetrahydroisoquinolines, N—$C_1$–$C_6$-benzomorpholines, 1-azabicyclo-[3.3.0]-octane, quinuclidine, N—$C_1$–$C_6$-alkyl-2-azabicyclo-[2.2.1]-octanes, N—$C_1$–$C_6$-alkyl-2-azabicyclo-[3.3.1]-nonanes, and N—$C_1$–$C_6$-alkyl-3-azabicyclo-[3.3.1]-nonanes, N,N,N',N'-tetraalkylalkylenediamines, including N,N,N',N'-tetraethyl-1,6-hexanediamine. Suitable quaternary ammonium salts and quaternary phosphonium salts include quaternary ammonium and quaternary phosphonium halides, illustrative examples of which include, but are not limited to, tetraethylammonium bromide, tetraethylammonium chloride, tetrapropylammonium bromide, tetrapropylammonium chloride, tetrabutylammonium bromide, tetrabutylammonium chloride, methyltributylammonium chloride, benzyltributylammonium chloride, benzyltriethylammonium chloride, benzyltrimethylammonium chloride, trioctylmethylammonium chloride, cetyldimethylbenzylammonium chloride, octyltriethylammonium bromide, decyltriethylammonium bromide, lauryltriethylammonium bromide, cetyltrimethylammonium bromide, cetyltriethylammonium bromide, N-laurylpyridinium chloride, N-laurylpyridinium bromide, N-heptylpyridinium bromide, tricaprylylmethylammonium chloride (sometimes known as ALIQUAT 336), methyltri-$C_8$–$C_{10}$-alkyl-ammonium chloride (sometimes known as ADOGEN 464), N,N,N',N',N'-pentaalkyl-alpha, omega-amine-ammonium salts such as disclosed in U.S. Pat. No. 5,821,322; tetrabutylphosphonium bromide, benzyltriphenylphosphonium chloride, triethyloctadecylphosphonium bromide, tetraphenylphosphonium bromide, triphenylmethylphosphonium bromide, trioctylethylphosphonium bromide, cetyltriethylphosphonium bromide. Suitable guanidinium salts include, but are not limited to, hexaalkylguanidinium salts and alpha,omega-bis(pentaalkylguanidinium)alkane salts, comprising hexaalkylguanidinium halides, alpha,omega-bis(pentaalkylguanidinium)alkane halides, hexaethylguanidinium halides, and hexaethylguanidinium chloride.

Organic solvents substantially immiscible with water suitable for use in hydroxy-terminated polyester intermediate synthesis include those, which are in one embodiment less than about 5 wt. % soluble in water, and in another embodiment less than about 2 wt. % soluble in water under the reaction conditions. Suitable organic solvents include, but are not limited to, dichloromethane, trichloroethylene, tetrachloroethane, chloroform, 1,2-dichloroethane, trichloroethane, toluene, xylene, trimethylbenzene, chlorobenzene, o-dichlorobenzene, the chlorotoluenes, and mixtures thereof. In particular embodiments water-immiscible solvents are chlorinated aliphatic compounds such as dichloromethane.

Suitable acid chlorides which may be used to prepare resins present in the polymer compositions and blends of the present invention comprise dicarboxylic acid dichlorides which comprise aromatic dicarboxylic acid dichlorides comprising monocyclic moieties, including isophthaloyl dichloride, terephthaloyl dichloride, or mixtures of isophthaloyl and terephthaloyl dichlorides, or comprising polycyclic moieties, including diphenyl dicarboxylic acid dichloride, diphenylether dicarboxylic acid dichloride, diphenylsulfone dicarboxylic acid dichloride, diphenylketone dicarboxylic acid dichloride, diphenylsulfide dicarboxylic acid dichloride, and naphthalenedicarboxylic acid dichloride, such as naphthalene-2,6-dicarboxylic acid dichloride; or comprising mixtures of aromatic dicarboxylic acid dichlorides comprising monocyclic moieties; or mixtures of aromatic dicarboxylic acid dichlorides comprising polycyclic moieties; or mixtures of aromatic dicarboxylic acid dichlorides comprising both monocyclic and polycyclic moieties. In some embodiments the dicarboxylic acid dichloride comprises mixtures containing isophthaloyl and/or terephthaloyl dichlorides in a molar ratio of isophthaloyl to terephthaloyl of in some embodiments about 0.25–4.0:1.

At least one chain-stopper (also referred to sometimes hereinafter as a "capping agent" or "endcapping agent", the two terms being used interchangeably) may also be used in the preparation of the resins contemplated in the invention. One purpose of adding at least one chain-stopper is to further limit the molecular weight of the polymer, thus providing polymer with controlled molecular weight. Suitable chain-stoppers include mono-phenolic compounds, mono-carboxylic acid chlorides, mono-chloroformates, and combinations thereof. The amount of chain-stopper added at any time during the reaction may be such as to cap all or at least a portion of polymer chain end-groups. Typically, at least one chain-stopper, when present, may be present in quantities of 0.05 to 10 mole %, based on dihydroxy-substituted aromatic hydrocarbon moieties in the case of mono-phenolic compounds and based on acid dichlorides in the case mono-carboxylic acid chlorides and/or mono-chloroformates.

Suitable mono-phenolic compounds include monocyclic phenols, such as unsubstituted phenol, $C_1$–$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms, in which in some embodiments about 47 to 89% of the hydrogen atoms are part of methyl groups as described in U.S. Pat. No. 4,334,053. For some embodiments a mono-phenolic UV screener is used as capping agent. Such compounds include 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, and like compounds. In various embodiments mono-phenolic chain-stoppers are at least one of phenol, p-cumylphenol, or resorcinol monobenzoate.

Suitable mono-carboxylic acid chlorides include monocyclic, mono-carboxylic acid chlorides, such as benzoyl chloride, $C_1$–$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic monocarboxylic acids with up to 22 carbon atoms are also suitable. Functionalized chlorides of aliphatic monocarboxylic acids, such as acryloyl chloride and methacryoyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof.

According to another aspect of the invention the second resin is selected from the group consisting of polycarbonates, polyarylates and copolyestercarbonates. Additionally, the second resin may optionally comprise polyarylate structural units I. The second resin typically comprises structural units derived from at least one bisphenol of formula HO-D-OH, wherein D is a divalent aromatic radical represented by formula VI:

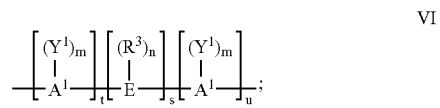

wherein $A^1$ is independently at each occurrence an aromatic group; E is independently at each occurrence an alkylene, alkylidene, or cycloaliphatic group; a sulfur-containing linkage; a phosphorus-containing linkage; an oxygen-containing ether linkage; a carbonyl group; a tertiary nitrogen group; or a silicon-containing linkage; $R^3$ is independently at each occurrence a monovalent hydrocarbon group; $Y^1$ is selected independently at each occurrence from the group consisting of a monovalent hydrocarbon group, halogen, bromine, chlorine; nitro; and —OR, wherein R is a monovalent hydrocarbon group; "m" represents any integer from and including zero through the number of positions on $A^1$ available for substitution; "n" represents an integer from and including zero through the number of positions on E available for substitution; "t" represents an integer equal to at least one; "s" is either zero or one; and "u" represents any integer including zero.

In ceratin embodiments the bisphenol HO-D-OH is selected from the group consisting of 1,1-bis(4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-1-(1-methylethylidine)]benzene; 1,3-bis[3-t-butyl-4-hydroxy-6-methylphenyl-1-(1-methylethylidine)]benzene; 1,4-bis[3-t-butyl-4-hydroxy-6-methylphenyl-1-(1-methylethylidine)]benzene; 4,4'-biphenol; 2,2',6,8-tetramethyl-3,3',5,5'-tetrabromo-4,4'-biphenol; 2,2',6,6'-tetramethyl-3,3',5-tribromo-4,4'-biphenol; 1,1-bis(4-hydroxyphenyl)-2,2,2-trichloroethane; 2,2-bis(4-hydroxyphenyl-1,1,1,3,3,3-hexafluoropropane); 1,1-bis(4-hydroxyphenyl)-1-cyanoethane; 1,1-bis(4-hydroxyphenyl)dicyanomethane; 1,1-bis(4-hydroxyphenyl)-1-cyano-1-phenylmethane; 2,2-bis(3-methyl-4-hydroxyphenyl)propane; 1,1-bis(4-hydroxyphenyl)norbornane; 9,9-bis(4-hydroxyphenyl)fluorene; 3,3-bis(4-hydroxyphenyl)phthalide; 1,2-bis(4-hydroxyphenyl)ethane; 1,3-bis(4-hydroxyphenyl)propenone; bis(4-hydroxyphenyl) sulfide; 4,4'-oxydiphenol; 4,4-bis(4-hydroxyphenyl)pentanoic acid; 4,4-bis(3,5-dimethyl-4-hydroxyphenyl)pentanoic acid; 2,2-bis(4-hydroxyphenyl) acetic acid; 2,4'-dihydroxydiphenylmethane; 2-bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl)cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 4,4'-[1-methyl-4-(1-methylethyl)-1,3-cyclohexandiyl]bisphenol (1,3 BHPM); 4-[1-[3-(4-hydroxyphenyl)4-methylcyclohexyl]-1-methyl-ethyl]-phenol (2,8 BHPM); 3,8-dihydroxy-5a,10b-diphenylcoumarano-2',3',2,3-coumarane (DCBP); 2-phenyl-3,3-bis(4-hydroxyphenyl)phthalimidine; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol; 4,4'-bis(3,5-dimethyl)diphenol; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; resorcinol; $C_{1-3}$ alkyl-substituted resorcinols; 3-(4-hydroxyphenyl)-1,1,3-trimethylindan-5-ol; 1-(4-hydroxyphenyl)-1,3,3-trimethylindan-5-ol; 4,4-dihydroxydiphenyl ether; 4,4-dihydroxy-3,3-dichlorodiphenylether; 4,4-dihydroxy-2,5-dihydroxydiphenyl ether; 4,4-thiodiphenol; 2,2,2',2'-tetrahydro-3,3,3',3'-tetramethyl-1,1'-spirobi[1H-indene]-6,6'-diol; and mixtures thereof.

Polycarbonates suitable for use as the second resin include polycarbonates comprising structural units having the formula VII, $$-\!\!\left[\!R^4\!-\!O\!-\!\overset{\overset{\displaystyle O}{\|}}{C}\!-\!O\!\right]\!\!-;\quad\text{VII}$$

in which $R^4$ is an $C_2$–$C_{50}$ aliphatic, $C_3$–$C_{50}$ cycloaliphatic, or a $C_4$–$C_{40}$ aromatic radical. The $R^4$ group is preferably an aromatic organic radical and, more preferably, a radical of the formula VIII,

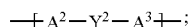

wherein each of $A^2$ and $A^3$ is a $C_3$–$C_{10}$ monocyclic divalent aromatic radical and $Y^2$ is a $C_1$–$C_{10}$ aliphatic radical having one or two atoms which separate $A^2$ from $A^3$, or a $C_3$–$C_{10}$ cycloaliphatic radical having one or two atoms which separate $A_2$ from $A_3$. Bisphenol A polycarbonate is especially suitable for use as the second resin and falls within the ambit of structural formulas VII and VIII. Examples of other polycarbonates falling within structures VII and VIII include bisphenol Z polycarbonate, 2,2'-dimethylbisphenol A polycarbonate, bisphenol M polycarbonate, and copolycarbonates incorporating structures VII or VIII.

Many suitable polycarbonates are commercially available and many others may be prepared by methods known in the art, such as interfacial polymerization using phosgene, bischloroformate polymerization method using bisphenol A bischloroformate, and melt polymerization method using bisphenol A and a diaryl carbonate, such as diphenyl carbonate.

Copolyestercarbonates suitable for use as the second resin include copolyestercarbonates comprising structural units of formula IX,

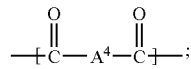

wherein, $A^4$ is a $C_1$–$C_{40}$ aliphatic radical. The structural units of formula IX may be derived from a diacid, and diacid derivatives of formula X,

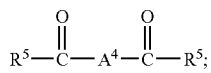

wherein $A^4$ is a $C_1$–$C_{40}$ aliphatic radical, and R is independently at each occurrence a hydroxyl, halogen or $C_7$–$C_{12}$ aryloxy group, or $C_7$–$C_{12}$ alkaryloxy group.

Suitable diacids and diacid derivatives, for example diacids, diacid halides, diesters and acid esters, encompassed within formula X include decanedioic acid, undecanedioic acid, dodecanedioic decanedioic acid, sebacic acid, adipic acid, suberic acid, oleic acid, azelaic acid, erucaic acid, brazzylic acid, isophthalic acid, terephthalic acid, malonic acid, malic acid, maleic acid, lactic acid, naphthalene-2,6-dicarboxylic acid, naphthalene-2,7-dicarboxylic acid, cyclohexane-1,4-dicarboxylic acid, biphenyl-3,4'-dicarboxylic acid biphenyl-4,4'-dicarboxylic acid, diphenylether-4,4'-dicarboxylic acid, diphenylsulfone-4,4'-dicarboxylic acid, diphenylketone-4,4'-dicarboxylic acid, diphenylsulfide-4,4'-dicarboxylic acid, diphenylmethane-4,4'-dicarboxylic acid, diphenyldichloromethane-4,4'-dicarboxylic acid, their corresponding diacid halides, diesters or acid esters and mixtures thereof.

Copolyestercarbonates suitable for use as the second resin include those copolyestercarbonates disclosed herein as suitable for use as the first resin (i.e. copolycarbonates comprising structure I) as well as which copolyestercarbonates incorporating structural units derived from aliphatic diacids or derivatives of aliphatic diacids. LEXAN SP, a copolycarbonate incorporating structural units derived from bisphenol A and dodecanedioic acid. LEXAN SP is available commercially from GE Advanced Materials, Pittsfield, Mass. Examples of suitable polyestercarbonates for use as the second resin and methods which may be used for preparing said copolyestercarbonates for use according to the present invention are found, for example in U.S. Pat. Nos. 4,238,596 and 4,238,597 and in copending U.S. patent application Ser. No. 10/639,998 filed Aug. 12, 2003, each of which references is incorporated herein by reference in its entirety.

In another embodiment, at least one of the first resin or second resins further comprises structural units having formula XI,

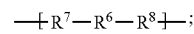

wherein, $R^6$ is a $C_2$–$C_{1000}$ aliphatic radical, or a $C_4$–$C_{1000}$ cycloaliphatic radical, and $R^7$ and $R^8$ each independently at each occurrence represent

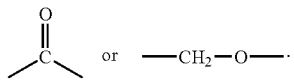

Structural units corresponding to formula XI are known to those skilled in the art as "soft blocks" or "soft block segments". Related polymers containing soft blocks or soft-block segments are disclosed in commonly owned U.S. Pat. No. 5,916,997 which is incorporated herein by reference in its entirety. In certain embodiments structural units of formula XI are derived from at least one of polyethylene glycol, polypropylene glycol, polybutylene glycol, polytetrahydrofuran diol, and polycaprolactone diol.

As will be appreciated by those skilled in the art the first and second resins may not be identical resins, but may be quite similar in composition.

The polymer compositions of the present invention may further comprise one or more resins in addition to the transparent blend consisting of the first resin and the second resin. For example, the polymer composition comprising the transparent polymer blend may further comprise one or more additional resins selected from the group consisting of polyamides, polyesters, polycarbonates; olefin polymers such as ABS, polystyrene, and polyethylene; polysiloxanes, polysilanes, polysulfones and polytetrafluoro ethylene. In certain embodiments the third resin may be present preferably in an amount less than or equal to 40 weight percent, more preferably less than or equal to 35 weight percent and most preferably less than or equal to about 30 weight percent based on the total weight of the polymer blend.

The polymer compositions of the present invention may contain various additives which may be used alone or in combination. These additives include such materials as thermal stabilizers, antioxidants, UV stabilizers, plasticizers, visual effect enhancers, extenders, antistatic agents, catalyst quenchers, mold releasing agents, fire retardants, blowing agents, impact modifiers and processing aids. The different additives that can be incorporated in the polymer compositions of the present invention are typically commonly used and known to those skilled in the art.

Visual effect enhancers, sometimes known as visual effects additives or pigments may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS #522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead.

Non-limiting examples of antioxidants that can be used in the polymer compositions of the present invention include tris(2,4-di-tert-butylphenyl)phosphite; 3,9-di(2,4-di-tert-butylphenoxy)-2,4,8,10-tetraoxa-3,9-diphosphaspiro[5.5]undecane; 3,9-di(2,4-dicumylphenoxy)-2,4,8,10-tetraoxa-3,9-diphosphaspiro[5.5]undecane; tris(p-nonylphenyl) phosphite; 2,2',2"-nitrilo[triethyl-tris[3,3',5,5'-tetra-tertbutyl-1,1'-biphenyl-2'-diyl]phosphite]; 3,9-distearyloxy-2,4,8,10-tetraoxa-3,9-diphosphaspiro[5.5]undecane; dilauryl phosphite; 3,9-di[2,6-di-tert-butyl-4-methylphenoxy]-2,4,8,10-tetraoxa-3,9-diphosphaspiro[5.5]undecane; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-biphenylene diphosphonite; (2,4,6-tri-tert-butylphenyl)-2-butyl-2-ethyl-1,3-propanediolphosphite; triisodecylphosphite; and mixtures of phosphites containing at least one of the foregoing. Tris(2,4-di-tert-butylphenyl) phosphite; 2,4,6-tri-tert-butylphenyl-2-butyl-2-ethyl-1,3-propanediol phosphite; bis (2,4-di-tert-butylphenyl)pentaerythritol diphosphite are especially preferred, as well as mixtures of phosphites containing at least one of the foregoing phosphites, and the like.

The thermoplastic composition may optionally comprise an impact modifier. The impact modifier resin added to the thermoplastic composition in an amount corresponding to about 1% to about 30% by weight, based on the total weight of the composition. Suitable impact modifiers include those comprising one of several different rubbery modifiers such as graft or core shell rubbers or combinations of two or more of these modifiers. Impact modifiers are illustrated by acrylic rubber, ASA rubber, diene rubber, organosiloxane rubber, ethylene propylene diene monomer (EPDM) rubber, styrene-butadiene-styrene (SBS) rubber, styrene-ethylene-butadiene-styrene (SEBS) rubber, acrylonitrile-butadiene-styrene (ABS) rubber, methacrylate-butadiene-styrene (MBS) rubber, styrene acrylonitrile copolymer and glycidyl ester impact modifier.

The term "acrylic rubber modifier" may refer to multi-stage, core-shell, interpolymer modifiers having a cross-linked or partially crosslinked (meth)acrylate rubbery core phase, preferably butyl acrylate. Associated with this cross-linked acrylic ester core is an outer shell of an acrylic or styrenic resin, preferably methyl methacrylate or styrene, which interpenetrates the rubbery core phase. Incorporation of small amounts of other monomers such as acrylonitrile or (meth)acrylonitrile within the resin shell also provides suitable impact modifiers. The interpenetrating network is provided when the monomers forming the resin phase are polymerized and cross-linked in the presence of the previously polymerized and cross-linked (meth)acrylate rubbery phase.

Suitable impact modifiers are graft or core shell structures with a rubbery component with a Tg below 0° C., preferably between about –40° to –80° C., composed of poly alkylacrylates or polyolefins grafted with polymethylmethacrylate (PMMA) or styrene acrylonitrile (SAN). Preferably the rubber content is at least 10 wt %, more preferably greater than 40 wt %, and most preferably between about 40 and 75 wt %.

Especially suitable impact modifiers are the butadiene core-shell polymers of the type available from Rohm & Haas, for example Paraloid® EXL2600. Most suitable impact modifier will comprise a two stage polymer having a butadiene based rubbery core and a second stage polymerized from methylmethacrylate alone or in combination with styrene. Other suitable rubbers are the ABS types Blendex® 336 and 415, available from GE Specialty Chemicals. Both rubbers are based on impact modifier resin of SBR rubber. Although several rubbers have been described, many more are commercially available. Any rubber may be used as an impact modifier as long as the impact modifier does not negatively impact the physical or aesthetic properties of the thermoplastic composition.

Non-limiting examples of processing aids that can be used include Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like.

Non-limiting examples of UV stabilizers that can be used include 2-(2'-Hydroxyphenyl)-benzotriazoles, e.g., the 5'-methyl-; 3',5'-di-tert.-butyl-; 5'-tert.-butyl-; 5'-(1,1,3,3-tetramethylbutyl)-; 5-chloro-3',5'-di-tert.-butyl-; 5-chloro-3'-tert.-butyl-5'-methyl-; 3'-sec.-butyl-5'-tert.-butyl-; 3'-alpha-methylbenzyl-5'-methyl; 3'-alpha-methylbenzyl -5'-methyl-5-chloro-; 4'-hydroxy-; 4'-methoxy-; 4'-octoxy-; 3',5'-di-tert.-amyl-; 3'-methyl-5'-carbomethoxyethyl-; 5-chloro-3', 5'-di-tert.-amyl-derivatives; and Tinuvin® 234 (available from Ciba Specialty Chemicals). Also suitable are the 2,4-bis-(2'-hydroxyphenyl)-6-alkyl-s-triazines, e.g., the 6-ethyl-; 6-heptadecyl- or 6-undecyl-derivatives. 2-Hydroxybenzophenones e.g., the 4-hydroxy-; 4-methoxy-; 4-octoxy-; 4-decyloxy-; 4-dodecyloxy-; 4-benzyloxy-; 4,2', 4'-trihydroxy-; 2,2',4,4'-tetrahydroxy- or 2'-hydroxy-4,4'-dimethoxy-derivative. 1,3-bis-(2'-Hydroxybenzoyl)-benzenes, e.g., 1,3-bis-(2'-hydroxy-4'-hexyloxy-benzoyl)-benzene; 1,3-bis-(2'-hydroxy-4'-octyloxy-benzoyl)-benzene or 1,3-bis-(2'-hydroxy-4'-dodecyloxybenzoyl)-benzene may also be employed. Esters of optionally substituted benzoic acids, e.g., phenylsalicylate; octylphenylsalicylate; dibenzoylresorcin; bis-(4-tert.-butylbenzoyl)-resorcin; benzoylresorcin; 3,5-di-tert.-butyl-4-hydroxybenzoic acid-2,4-di-tert.-butylphenyl ester or -octadecyl ester or -2-methyl-4,6-ditert.-butyl ester may likewise be employed. Acrylates, e.g., alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or -butyl ester or N(beta-carbomethoxyvinyl)-2-methyl-indoline may likewise be employed. Oxalic acid diamides, e.g., 4,4'-di-octyloxy-oxanilide; 2,2'-di-octyloxy-5,5'-di-tert.-butyl-oxanilide; 2,2'-di-dodecyloxy-5,5-di-tert.-butyl-oxanilide; 2-ethoxy-2'-ethyl-oxanilide; N,N'-bis-(3-dimethyl-aminopropyl)-oxalamide; 2-ethoxy-5-tert.-butyl-2'-ethyloxanilide and the mixture thereof with 2-ethoxy-2'-ethyl-5,4'-di-tert.-butyl-oxanilide; or mixtures of ortho- and para-methoxy- as well as of o- and p-ethoxy-disubstituted oxanilides are also suitable as UV stabilizers. Preferably the ultraviolet light absorber used in the instant compositions is 2-(2-hydroxy-5-methylphenyl)-2H-benzotriazole; 2-(2-hydroxy-3,5-di-tert-amylphenyl)-2H-benzotriazole; 2-[2-hydroxy-3,5-di-(alpha,alpha-dimethylbenzyl)phenyl]-2H-benzotriazole; 2-(2-hydroxy-5-tert-octylphenyl)-2H-benzotriazole; 2-hydroxy-4-octyloxybenzophenone; nickel bis(O-ethyl 3,5-di-tert-butyl-4-hydroxybenzylphosphonate); 2,4-dihydroxybenzophenone; 2-(2-hydroxy-3-tert-butyl-5-methylphenyl)-2H-benzotriazole; nickel butylamine complex with 2,2'-thiobis(4-tert-butylphenol); 2-ethoxy-2'-ethyloxanilide; 2-ethoxy-2'-ethyl-5,5'-ditert-butyloxanilide; or a mixture thereof.

Non-limiting examples of fire retardants that can be used include potassium nonafluorobutylsulfonate, potassium diphenylsulfone sulfonate, and phosphite esters of polyhydric phenols, such as resorcinol and bisphenol A.

Non-limiting examples of mold release compositions include esters of long-chain aliphatic acids and alcohols such as pentaerythritol, guerbet alcohols, long-chain ketones, siloxanes, alpha.-olefin polymers, long-chain alkanes and hydrocarbons having 15 to 600 carbon atoms.

As discussed herein, numerous methods of varying block lengths in copolyestercarbonates are known in the art. It has been discovered within the context of the instant invention that surprisingly, in instances in which the first resin comprises polyarylate blocks and the second resin is bisphenol A polycarbonate the molecular weight of the polyarylate blocks in the first resin can affect the miscibility of the first resin with the second resin. A summary of experimental findings made as part of the instant invention is provided in Table 1. Referring to Table 1 it is has been found that where the blend contains a higher concentration of polyarylate blocks ("mol % ITR"), the blend exhibits the greater transparency when the molecular weight of the polyarylate block (ITR block) is lower. Thus, it is possible to further optimize the performance characteristics of the polymer blends of the present invention (and compositions comprising such blends) by judicious selection of the molecular weight of the polyarylate blocks present in the first resin and optionally present in the second resin.

TABLE 1

Transparency in Blends of ITR Block Copolymers With Bisphenol A Polycarbonate

| Mol % ITR | ITR Block MW | |
|---|---|---|
| <26% | <7800 | Most preferred |
| <26% | <8500 | More Preferred |
| 26 to 30% | ≦4000 | Most Preferred |
| 26 to 30% | ≦5000 | Preferred |
| >30 to 35% | ≦5000 | Preferred |

The polymer compositions of the present invention may be prepared by combining and mixing the blend components (the first and second resins) with any additional polymer composition components, for example by melt mixing in a single screw or twin-screw extruder, mixing the components of the blend and composition as powders on a two-roll mill, a Banbury mixer or, in a paint shaker, and, optionally, then reducing the composition so formed to particulate form (e.g. by pelletizing or grinding the composition). For example, mixing on a roller mixer the transparent blend (consisting of the first resin and the second resin) in powder form with powdered bisphenol A polycarbonate to provide a mixture which is then extruded to afford a polymer composition of the present invention comprising polycarbonate and a transparent blend consisting of the first resin and the second resin.

In some embodiments, one or more components can be added to the polymer composition as an aqueous mixture or solution followed by devolatilization in appropriate processing equipment such as in an extruder. In another embodiment, some of the components may be mixed in aqueous solution and then evaporated to form a material which can be added to the remaining components.

In a preferred embodiment, the polymer composition after molding into a ⅛" thick test chip exhibits a light transmission value measured in accordance with the ASTM 1003 test method of between about 70% and about 90%, and a haze value (also measured on a ⅛" thick chip) measured in accordance with ASTM D1003 method of less than about 20, preferably less than about 10%.

The polymer compositions of the present invention can be molded into useful shaped articles by a variety of means such as injection molding, extrusion, rotational molding, blow molding and thermoforming to form articles such as, for example, computer and business machine housings, hand held electronic device housings, and components of lighting fixtures, ornaments, home appliances, roofs, greenhouses, sun rooms, swimming pool enclosures, and the like.

The polymer compositions described above may also be used in the fabrication of translucent plastic sheet materials. Techniques for the extrusion of translucent sheets, including solid sheets, multi-wall sheets, and multi-wall sheets comprising hollow bodies, are known in the art and described in, for example, U.S. Pat. No. 3,476,627 to Squires, U.S. Pat. No. 3,565,985 to Schrenk et al., U.S. Pat. No. 3,668,288 to Takahashi, U.S. Pat. No. 3,918,865 to Nissel, U.S. Pat. No. 3,933,964 to Brooks, U.S. Pat. No. 4,477,521 to Lehmann et al., and U.S. Pat. No. 4,707,393 to Vetter. There is no particular limitation on the composition of additional layers used to form coextruded sheets. There is no particular limitation on the structure or geometry of the multi-wall sheets. The additional layers may comprise, for example, fluorescing agents to facilitate manufacturing and/or ultraviolet light absorbers to improve weatherability. The thickness of the multi-wall sheet is preferably about 4 mm to about 40 mm, while the thickness of the solid sheet is preferably about 1 mm to about 12 mm.

The polymer compositions of the present invention may be utilized in multi-layer materials. One example of a multi-layer material is as a cap layer on a substrate. Useful substrates would be those that that are compatible with the thermoplastic composition and would suffer little or no delamination under processing or normal use conditions. Multi-layer materials can be formed by a number of methods, including but not limited to co-extrusion, compression molding, and lamination.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims. The disclosure is further illustrated by the following non-limiting examples.

Experimental Section

Polymer molecular weight ($M_w$) was measured by gel permeation chromatography (GPC). GPC molecular weight values quoted are relative to those measured for a polycarbonate standard. Ductility was measured using the ASTM D 256 method. In the Examples which follow and in the preceding discussion the term "ITR" refers to isophthaloyl-terephthaloyl-resorcinol structural units, "RSCO" refers to resorcinol carbonate structural units, and BPACO refers to bisphenol A carbonate structural units. The various structural units present may be configured in a blocky or a random fashion but for convenience sake are referred to as "blocks". For example, a copolycarbonate having an essentially random distribution of bisphenol A carbonate (BPACO) and resorcinol carbonate (RSCO) structural units may still be referred to as comprising "BPACO blocks" and "RSCO blocks".

EXAMPLES

Example 1

In this example, an ITR-BPA block copolymer (the first resin) consisting of 16 mol % ITR polyarylate blocks, 7 mol % resorcinol carbonate (RSCO) blocks and 77 mol % BPA carbonate (BPACO) blocks, designated 16/7/77 (ITR/RSCO/BPACO) was prepared and then this ITR-BPA block copolymer was blended in a 50:50 powder mixture with BPA polycarbonate homopolymer.

To a stirred mixture of 1581 grams (g) of resorcinol and 28 milliliters (mL) of triethylamine in 9.2 liters (L) of methylene chloride and 1.3 L of water, was added a solution of 2030 grams of a 50/50 mixture of iso- and terephthaloyl chloride in 3.8 kilograms (kg) of methylene chloride at about 292 mL/minute. Concurrently, 50% sodium hydroxide solution was added at about 62 mL/minute to maintain the pH between about 4 and 7. After the acid chloride addition was completed, the caustic was slowly added until a stable pH of 7.5 to 8.5 was obtained. Then the mixture was stirred for about 10 minutes. The molecular weight ($M_w$) of the resultant hydroxy-terminated polyarylate, the ITR block precursor, was found to be about 4,200 g/mole. To the hydroxy-terminated polyarylate was added 10,994 grams BPA, 440 grams of p-cumylphenol, 112 mL of triethylamine, 33 L of water and 27 L of methylene chloride. Phosgene (6537 gms) was then added via a dip tube while the pH was maintained at about 8.5 to 10.5 with 50% caustic solution. The organic phase was separated from the brine layer, washed with dilute hydrochloric acid, and with water 3 times in a liquid-liquid centrifuge. The polymer was isolated by steam precipitation and dried in a fluidized bed dryer. The product copolyestercarbonate had an molecular weight ($M_w$) of 27,330 g/mole (by GPC calibrated with PC standards) and had a $^1$H-NMR spectrum consistent with a copolyestercarbonate comprising the 3 basic structural types, ITR (16 percent), RSCO (7.0 percent) and BPACO (77 percent). The molar percent ratios were calculated as follows:

*ITR* mol %=100×moles of Diacid chloride/(moles of Diacid chloride+moles of *BPA*+(moles of resorcinol−moles of diacid chloride)).

*RSCO* mol %=100×(moles of resorcinol−moles of diacid chloride)/(moles of Diacid chloride+ moles of *BPA*+(moles of resorcinol−moles of diacid chloride)).

*BPA CO* mol %=100×moles of *BPA*/(moles of Diacid chloride+moles of *BPA*+(moles of resorcinol−moles of diacid chloride)).

Preparation of blend: The product copolyestercarbonate powder prepared as described above (also referred to as the ITR-BPA block copolymer) and BPA polycarbonate homopolymer in powder form (50/50 weight percent) was mixed in a paint shaker with Doverphos S9228 in an amount corresponding to 0.03 weight percent of the blend composition. The powdery blend was then molded into 2×3×0.125 inch color chips on an 85 ton molding machine with a barrel temperature of 600° F. and a mold temperature of 180° F. The properties the blend were evaluated and results are tabulated in Table 2.

Examples 2–21 and Comparative Examples 1 and 2

In these examples the ITR-BPA block copolymers comprising varying amounts of ITR polyarylate blocks, resorcinol carbonate (RSCO) blocks and BPA carbonate (BPACO) blocks were prepared and then blended 50:50 with BPA homopolycarbonate. The blends were prepared in a manner to that described in Example 1 above. Results are tabulated in Table 2.

TABLE 2

| | Copolymer Composition | | | | | | Clarity on blending with BPA polycarbonate homopolymer | | |
|---|---|---|---|---|---|---|---|---|---|
| Example | ITR | RSCO | BPACO | ITR Block Mw (g/mol.) | % Transmission | Haze Level of ITR Resin | % Difference in ITR | % Transmission of ITR Resin | Haze as Molded |
| 1 | 15.8 | 7.0 | 77.2 | 4200 | 89.0 | 0.99 | 15.8 | 89.3 | 0.85 |
| 2 | 15.3 | 4.6 | 80.2 | 5500 | 89.0 | 0.87 | 15.3 | 89.5 | 0.50 |
| 3 | 16.3 | 4.2 | 79.5 | 7670 | 88.8 | 0.84 | 16.3 | 89.3 | 0.66 |
| 4 | 16.3 | 4.2 | 79.5 | 8195 | 87.3 | 1.10 | 16.3 | 86.3 | 1.49 |
| 5 | 18.5 | 7.4 | 74.1 | 3100 | 89.1 | 0.79 | 18.5 | 89.2 | 0.32 |
| 6 | 18.5 | 7.4 | 74.1 | 4400 | 88.9 | 0.82 | 18.5 | 89.1 | 0.47 |

TABLE 2-continued

| | Copolymer Composition | | | | | | Clarity on blending with BPA polycarbonate homopolymer % | | |
|---|---|---|---|---|---|---|---|---|---|
| Example | ITR | RSCO | BPACO | ITR Block Mw (g/mol.) | % Transmission | Haze Level of ITR Resin | % Difference in ITR | % Transmission of ITR Resin | Haze as Molded |
| 7 | 18.9 | 5.7 | 75.5 | 5800 | 89.0 | 0.95 | 18.9 | 89.1 | 0.84 |
| 8 | 19.2 | 3.8 | 76.9 | 6100 | 88.9 | 0.86 | 19.2 | 89.1 | 0.58 |
| 9 | 18.9 | 5.7 | 75.5 | 6471 | 88.7 | 0.87 | 18.9 | 89.3 | 0.65 |
| 10 | 19.2 | 3.8 | 76.9 | 7400 | 88.9 | 0.81 | 19.2 | 89.3 | 0.43 |
| 11 | 18.9 | 5.7 | 75.5 | 8000 | 88.7 | 0.98 | 18.9 | 88.3 | 1.79 |
| 12 | 19.2 | 3.8 | 76.9 | 9500 | 83.2 | 3.17 | 19.2 | 71.8 | 15.40 |
| 13 | 21.6 | 6.1 | 72.3 | 4370 | 88.9 | 0.92 | 21.6 | 89.2 | 0.80 |
| 14 | 21.5 | 6.5 | 73.0 | 7841 | 88.7 | 0.89 | 21.5 | 87.0 | 1.84 |
| 15 | 22.4 | 6.7 | 70.0 | 5500 | 89.0 | 0.82 | 22.4 | 89.1 | 0.52 |
| 16 | 26.1 | 13.0 | 60.0 | 3500 | 88.8 | 0.99 | 26.1 | 89.2 | 0.54 |
| 17 | 26.5 | 11.7 | 61.8 | 4912 | 87.9 | 1.05 | 26.5 | 86.3 | 2.23 |
| 18 | 29.8 | 14.9 | 55.3 | 3801 | 88.9 | 0.91 | 29.8 | 89.0 | 0.64 |
| 19 | 30.3 | 13.3 | 56.3 | 4054 | 88.7 | 0.89 | 30.3 | 89.2 | 0.63 |
| 20 | 33.3 | 16.7 | 50.0 | 3684 | 88.5 | 0.95 | 33.3 | 80.0 | 4.32 |
| 21 | 34.0 | 15.0 | 51.0 | 3843 | 88.0 | 1.08 | 34.0 | 81.9 | 5.17 |
| 1* | 51.0 | 15.0 | 34.0 | 5500 | 88.0 | 1.00 | 51.0 | 45.0 | 99.00 |
| 2* | 82.0 | 8.0 | 10.0 | 12000 | 88.0 | 1.00 | 82.0 | 30.0 | 100.00 |

*indicates Comparative Example

Each of the copolymer resins listed in Table 2 was prepared as described in Example 1. The powders from each resin batch were mixed with BPA polycarbonate homopolymer powder (50/50 wt %) and 0.03 percent Doverphos-S9228 in a paint shaker. After blending and drying, the powder was injection molded at 580° F. in a 85 ton molding machine. After molding the samples were observed visually for transparency. In some cases, the samples were annealed for 1 hr at 170° C. (samples were dried at 120° C. overnight before annealing) in an attempt to induce haze formation as a result of increased phase separation. The following comparisons are illustrative:

Comparison of Examples 1 to 21 versus Comparative Examples 1 and 2 shows that blends wherein the difference in the mol % ITR is less than about 40% are characterized by low haze.

Examples 1 to 3, 5 to 10, 13 and 15 versus 4, 11, 12, and 14 show that in blends of BPA polycarbonate with copolymers containing less than 26 mol % ITR, lower molecular weight ITR blocks are preferred, and ITR blocks having a molecular weight of less than about 7800 g/mol are most preferred based on the "as molded" haze values.

Examples 4, 11, and 14 versus 12 show that blending with BPA polycarbonate with copolymers with less than 26 mol % ITR, ITR block molecular weights of less than 8500 g/mol are preferred based on the "as molded" haze values.

Examples 16 versus 17 show that blending with BPA polycarbonate with copolymers with approximately 26 mol % ITR, ITR block molecular weights of less than 4900 g/mol are preferred based on the "as molded" haze values.

Example 22

In this example an 81% ITR resin was blended with a 51% ITR Resin.

To a stirred mixture of 4360 g of resorcinol, 310 g of p-cumylphenol and 100 mL of triethylamine in 29 L of methylene chloride and 4.6 L of water, was added a solution of 7309 g of a 50/50 mixture of iso- and terephthaloyl chloride in 13.6 kg of methylene chloride at about 525 mL/minute. Concurrently, 50% sodium hydroxide was added at about 112 ml/minute to maintain the pH between 4 and 7. After the acid chloride addition was complete, the caustic addition was slowly added until a stable pH of 7.5 to 8.5 was obtained. Then the mixture was stirred for about 10 min. ((The hydroxy-terminated polyarylate ITR molecular weight was about 12,000 g/mol by GPC calibrated with PC standards). To the solution of the hydroxy-terminated polyarylate ITR oligomer was then added 1068 g of BPA, 24 L of water and 4 L of methylene chloride. Phosgene (1350 gms) was then added via a dip tube while the pH was maintained at about 8.5 to 10.5 with 50% caustic. When essentially all of the phosgene had been consumed the organic phase was separated from the brine layer, washed with dilute hydrochloric acid, and with water in a liquid-liquid centrifuge. The polymer was isolated by steam precipitation and dried in a fluidized bed dryer. The ITR-BPA block copolymer was shown by $^1$H-NMR to be comprised of "ITR", "RSCO" and "BPACO" structural units. The NMR results were in agreement with the calculated molar ratio of 82/8/10 ITR/RSCO/BPACO. The ITR-BPA block copolymer had a molecular weight of 26,000 g/mol.

Preparation of blends: A 50:50 mixture of the 82/8/10 ITR/RSCO/BPACO ITR-BPA block copolymer prepared above and an ITR-BPA block copolymer with a composition of 51/15/34 ITR/RSCO/BPACO was mixed in a paint shaker with 0.03 weight percent of Doverphos S9228. The powder mixture was then molded into 2×3×0.125 inch color chips on a 85 ton molding machine with a barrel temperature of 600° F. and a mold temperature of 180° F. Results are tabulated in Table 3 below.

Examples 23–33

In these examples resin 1, an ITR resin was blended with resin 2, another ITR Resin. Results are tabulated in Table 3 below.

TABLE 3

| | Composition of Resin 1 | | | | Composition of Resin 2 | | | | | Clarity Of | |
|---|---|---|---|---|---|---|---|---|---|---|---|
| Blend | ITR | RS CO | BPA CO | ITR Block Length | ITR | RS CO | BPA CO | ITR Block Length | Difference in ITR | Resultant Blend | Haze As Molded |
| 22 | 82 | 8 | 10 | 12000 | 51 | 15 | 34 | 6000 | 31 | transparent | 0.9 to 1.2 |
| 23 | 82 | 8 | 10 | 12000 | 43 | 14 | 43 | 6000 | 39 | Some Haze | NA |
| 24 | 82 | 8 | 10 | 12000 | 51 | 15 | 34 | 6000 | 31 | transparent | 0.9 to 1.2 |
| 25 | 82 | 8 | 10 | 12000 | 63 | 10 | 27 | 8500 | 19 | transparent | NA |
| 26 | 63 | 10 | 27 | 8500 | 43 | 14 | 43 | 6000 | 20 | transparent | NA |
| 27 | 51 | 15 | 34 | 6000 | 19 | 6 | 75 | 6000 | 32 | Some Haze | 1.9 |
| 28 | 43 | 14 | 43 | 6000 | 19 | 6 | 75 | 6000 | 24 | transparent | NA |
| 29 | 28 | 8 | 64 | 6000 | 19 | 6 | 75 | 6000 | 9 | transparent | NA |
| 30 | 28 | 8 | 64 | 6000 | 0 | 0 | 100 | — | 28 | Some Haze | NA |
| 31 | 19 | 6 | 75 | 6000 | 10 | 3 | 87 | 6000 | 9 | transparent | NA |
| 32 | 19 | 6 | 75 | 6000 | 0 | 0 | 100 | — | 19 | transparent | NA |
| 33 | 10 | 3 | 87 | 6000 | 0 | 0 | 100 | — | 10 | transparent | NA |
| 3* | 82 | 8 | 10 | 12000 | 10 | 3 | 87 | 6000 | 72 | opaque | NA |
| 4* | 82 | 8 | 10 | 12000 | 19 | 6 | 75 | 6000 | 63 | opaque | NA |
| 5* | 63 | 10 | 27 | 8500 | 19 | 6 | 75 | 6000 | 44 | opaque | NA |

*indicates Comparative Example

The results in Table 3 illustrate that optimal transparency is achieved when the difference in polyarylate structural unit content (See tabulated values under the headings "Composition of Resin 1" and "Composition of Resin 2" and subheading "ITR") is less than about 40 mole percent as indicated in the column under the heading "Difference in ITR". The variation in the clarity of the blend is shown to depend on the difference in ITR content in Resin 1 and Resin 2 and also shows the dependency of the clarity on the block lengths of the hydroxy-terminated polyarylate intermediates used in the preparation of the copolyestercarbonates comprising Resins 1 and 2.

Example 34

This example further illustrates how the ITR block length (block molecular weight) may be varied in order to optimize the optical properties of transparent polymer blends.

A 50/50 weight percent blend of two ITR copolymers was made in which the first copolymer had an ITR content of 51% and the second had an ITR content of 81%. The difference in ITR content of the two ITR copolymers was about 30%. The first copolymer with an ITR content of 51% had an ITR block molecular weight of about 5000 g/mol. The second resin had an ITR copolymer content of about 81% and an ITR block molecular weight of about 12,000 g/mol. The powders were dry blended with 0.03 percent of Doverphos-S9228 and molded as described as above into 2×3×0.125 inch chips. The chips were transparent before and after annealing.

Example 35–39

These examples provide additional compositions prepared in accordance with this invention. Table 4 provides the components used in the composition and Table 5 provides the mechanical properties of the compositions.

TABLE 4

| Polymer Composition | 35 | 36 | 37 | 38 | 39 |
|---|---|---|---|---|---|
| 19/6/75 ITR/RSCO/ BPA CO Copolymer | 90.00 | 90.00 | 20.00 | 20.00 | 20.00 |
| 51/15/34 ITR/RS CO/ BPA CO Copolymer | 0.00 | 0.00 | 80.00 | 80.00 | 80.00 |
| 30,000 MW Polycarbonate | 7.00 | 7.00 | 0.00 | | |
| 22,000 MW Polycarbonate | 3.00 | 3.00 | 0.00 | | |
| TINUVIN 234 (Ciba Specialty Chemicals Corporation) | 0.30 | 0.00 | 0.00 | 0.30 | 0.50 |
| Pentaerythritol tetrastearate mold release | 0.30 | 0.30 | 0.30 | 0.30 | 0.30 |
| SANDOSTAB P-EPQ Powdered phosphite (Clariant Corporation) | 0.03 | 0.03 | 0.03 | 0.03 | 0.03 |
| Commercial cycloaliphatic epoxide resin additive | 0.03 | 0.03 | 0.03 | 0.03 | 0.03 |
| Commercial acrylic core shell impact modifier additive | | | | | 3.00 |

TABLE 5

| PROPERTY | Units | TEST METHOD | 35 | 36 | 37 | 38 | 39 |
|---|---|---|---|---|---|---|---|
| MECHANICAL | | | | | | | |
| Tensile strength, yield, Type 1, 0.125" | psi | ASTM D 638 | 9480 | 9380 | 10300 | 10400 | 9630 |
| Tensile Strength, break, Type 1, 0.125" | psi | ASTM D 638 | 10900 | 10800 | 10800 | 11300 | 10200 |

TABLE 5-continued

| PROPERTY | Units | TEST METHOD | 35 | 36 | 37 | 38 | 39 |
|---|---|---|---|---|---|---|---|
| Tensile Modulus, Type 1, 0.125" | psi | ASTM D 638 | 361000 | 356000 | 382000 | 386000 | 365000 |
| Tensile Elongation, yield, Type 1, 0.125" | % | ASTM D 638 | 6.26 | 6.3 | 6.18 | 6.12 | 6 |
| Tensile Elongation, break, Type 1, 0.125" | % | ASTM D 638 | 131 | 131 | 115 | 123 | 107 |
| Flexural Strength, yield, Type 1, 0.125" | psi | ASTM D 790 | 15000 | 14900 | 16200 | 16300 | 15100 |
| Flexural Modulus, 0.125" | psi | ASTM D 790 | 358000 | 353000 | 370000 | 376000 | 365000 |
| IMPACT | | | | | | | |
| Izod Impact, notched, 23° C. | ft-lb/in | ASTM D 256 | 16 | 15 | 13 | 14 | 16 |

Examples 40–49 and Comparative Examples 6 and 7

These examples provide colored compositions prepared in accordance with the present invention. The components used in the composition and the gloss retention data are provided in Table 6 below. Gloss was measured on test parts molded from the polymer compositions using a BYK-GARDNER MICRO TRI GLOSSMETER.

TABLE 6

| Polymer Composition | 40 | 41 | 42 | 43 | 44 | 45 | 46 |
|---|---|---|---|---|---|---|---|
| Mol % ITR Difference Between 1st and 2nd Polymer | 19 | 32 | 32 | 32 | 19 | 19 | 32 |
| 19/6/75 ITR/RSCO/BPA CO Copolymer | 90.00 | 55.00 | 55.00 | 55.00 | 90.00 | 90.00 | 55.00 |
| 51/15/34 ITR/RS CO/BPA CO Copolymer | 0.00 | 15.00 | 15.00 | 15.00 | 0.00 | 0.00 | 15.00 |
| 81/8/11 ITR/RS CO/BPA CO Copolymer | 0.00 | 0.00 | 0.00 | 0.00 | 0.00 | 0.00 | 0.00 |
| BPA Polycarbonate Homopolymer | 10.00 | 30.00 | 30.00 | 30.00 | 10.00 | 10.00 | 30.00 |
| Tris(2,4-di-tertbutylphenyl) phosphite | 0.00 | 0.00 | 0.00 | 0.00 | 0.00 | 0.00 | 0.00 |
| Pentaerythritol tetrastearate mold release | 0.300 | 0.300 | 0.30 | 0.30 | 0.30 | 0.30 | 0.3 |
| SANDOSTAB P-EPQ Powdered phosphite (Clariant Corporation) | 0.150 | 0.150 | 0.03 | 0.15 | 0.03 | 0.15 | 0.03 |
| Titanium dioxide (white inorganic pigment) | 0.328 | 0.328 | 0.31 | 0.31 | 0.31 | 0.31 | 0.350 |
| Yellow Anthraquinone (organic dye) | 0.12 | 0.12 | 0.115 | 0.115 | 0.115 | 0.115 | 0.145 |
| Yellow mixed metal oxide pigment (inorganic pigment) | 0.28** | 0.28** | 0.319 | 0.319 | 0.319 | 0.319 | 0.36 |
| Carbon Black (powder form) | 0.00084 | 0.00084 | 0.0013 | 0.0013 | 0.0013 | 0.0013 | 0.00115 |

TABLE 6-continued

| | | | | | | | |
|---|---|---|---|---|---|---|---|
| Red iron oxide pigment (inorganic pigment) | 0.038 | 0.038 | 0.034 | 0.034 | 0.034 | 0.034 | 0.038 |
| TINUVIN 234 (Ciba Specialty Chemicals) Corporation | 0.3 | 0.3 | 0.3 | 0.3 | 0.3 | 0.3 | 0.3 |
| cycloaliphatic epoxide resin additive | 0.03 | 0.03 | 0.03 | 0.03 | 0.03 | 0.03 | 0.030 |

60 Degree Gloss Data

| | | | | | | | |
|---|---|---|---|---|---|---|---|
| Initial | 100 | 101 | 101 | 103 | 103 | 103 | 103.0 |
| 1810 KJ/M2 | 86 | 82 | 82 | 82 | 89 | 87 | 62.05*** |
| % Retention | 86 | 81 | 81 | 80 | 86 | 84 | 60.2 |

| Polymer Composition | 47 | 48 | 49 | 6* | 7* |
|---|---|---|---|---|---|
| Mol % ITR Difference Between 1st and 2nd Polymer | 19 | 32 | 32 | 51 | 81 |
| 19/6/75 ITR/RSCO/BPA CO Copolymer | 50.00 | 25.00 | 55.00 | 0.00 | 0.00 |
| 51/15/34 ITR/RS CO/BPA CO Copolymer | 0.00 | 45.00 | 15.00 | 35.00 | 0.00 |
| 81/8/11 ITR/RS CO/BPA CO Copolymer | 0.00 | 0.00 | 0.00 | 0.00 | 20.00 |
| BPA Polycarbonate Homopolymer | 50.00 | 30.00 | 30.00 | 65.00 | 80.00 |
| Tris(2,4-di-tertbutylphenyl) phosphite | 0.00 | 0.00 | 0.030 | 0.00 | 0.00 |
| Pentaerythritol tetrastearate mold release | 0.3 | 0.3 | 0.3 | 0.3 | 0.3 |
| SANDOSTAB P-EPQ Powdered phosphite (Clariant Corporation) | 0.03 | 0.03 | 0.00 | 0.03 | 0.03 |
| Titanium dioxide (white inorganic pigment) | 0.350 | 0.350 | 0.350 | 0.350 | 0.350 |
| Yellow Anthraquinone (organic dye) | 0.145 | 0.145 | 0.145 | 0.145 | 0.145 |
| Yellow mixed metal oxide pigment (inorganic pigment) | 0.36 | 0.36 | 0.36 | 0.36 | 0.36 |
| Carbon Black (powder form) | 0.00115 | 0.00115 | 0.00115 | 0.00115 | 0.00115 |
| Red iron oxide pigment (inorganic pigment) | 0.038 | 0.038 | 0.038 | 0.038 | 0.038 |
| TINUVIN 234 (Ciba Specialty Chemicals) Corporation | 0.3 | 0.3 | 0.3 | 0.3 | 0.3 |
| cycloaliphatic epoxide resin additive | 0.030 | 0.030 | 0.030 | 0.030 | 0.030 |

TABLE 6-continued

| | 60 Degree Gloss Data | | | | |
|---|---|---|---|---|---|
| Initial | 101.8 | 104.3 | 102.6 | 101.8 | 97.1 |
| 1810 KJ/M2 | 59.05*** | 66.3*** | 61.9*** | 56.6*** | 52.4*** |
| % Retention | 58.0 | 63.6 | 60.3 | 55.6 | 54.0 |

**Sicotan Yellow K 2001 FG (BASF Corporation Performance Chemicals).
***2500 KJ/M² (Kilojoules per meter square)

In Examples 40 to 49 where the difference in ITR content is less than 40 mol. % the gloss retention is higher (superior gloss retention performance). In Comparative Examples 6 and 7 in which the difference in ITR is greater than 40 mol. % the gloss retention is lower (inferior gloss retention performance).

The invention has been described in detail with particular reference to preferred embodiments thereof, but it will be understood by those skilled in the art that variations and modifications can be effected within the spirit and scope of the invention.

What is claimed is:

1. A polymer composition comprising: a transparent polymer blend, said transparent polymer blend comprising;
   (a) a first ITR resin, said first ITR resin comprising polyarylate structural units of formula I

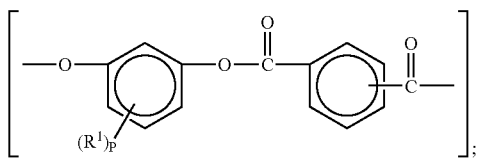

wherein $R^1$ is independently at each occurrence a $C_1$–$C_{12}$ alkyl group, or a halogen atom, and p is 0 to 3; and
   (b) a second ITR resin, said second resin comprising polyarylate structural units I;
said polyarylate structural units being present in an amount corresponding to a mole percentage of the total repeat units of said first ITR resin and a mole percentage of the total repeat units of said second ITR resin;
said first ITR resin and said second ITR resin being characterized by a difference in polyarylate structural unit content, said difference being about 9 to about 40 mole percent.

2. The polymer composition of claim 1, wherein said difference in polyarylate structural unit content is less than or equal to 30 mole percent.

3. The polymer composition of claim 1, wherein said difference in polyarylate structural unit content is less than or equal to 20 mole percent.

4. The polymer composition of claim 1, wherein the first resin further comprises structural units of the formula IV,

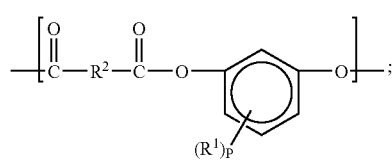

wherein, each $R^1$ is independently at each occurrence a $C_1$–$C_{12}$ alkyl group, or a halogen atom; p is 0 to 3; and $R^2$ is a single bond, a $C_1$–$C_{50}$ divalent aliphatic radical, a $C_3$–$C_{50}$ cycloaliphatic radical, or a $C_4$–$C_{40}$ aromatic radical.

5. The polymer composition of claim 1, wherein said second resin comprises structural units derived from at least one bisphenol of formula HO-D-OH, wherein D is a divalent aromatic radical represented by formula VI,

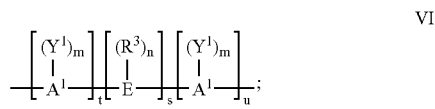

wherein $A^1$ is independently at each occurrence an aromatic group; E is independently at each occurrence an alkylene, alkylidene, or cycloaliphatic group; a sulfur-containing linkage; a phosphorus-containing linkage; an oxygen-containing ether linkage; a carbonyl group; a tertiary nitrogen group; or a silicon-containing linkage; $R^3$ is independently at each occurrence a monovalent hydrocarbon group; $Y^1$ is selected independently at each occurrence from the group consisting of a monovalent hydrocarbon group, halogen, nitro, and —OR, wherein R is a monovalent hydrocarbon group; "m" represents any integer from and including zero through the number of positions on $A^1$ available for substitution; "n" represents an integer from and including zero through the number of positions on E available for substitution; "t" represents an integer equal to at least one; "s" is either zero or one; and "u" represents any integer including zero.

6. The polymer blend according to claim 5 wherein bisphenol HO-D-OH is selected from the group consisting of 1,1-bis(4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-1-(1-methylethylidine)]benzene; 1,3-bis[3-t-butyl-4-hydroxy-6-methylphenyl-1-(1-methylethylidine)]benzene; 1,4-bis[3-t-butyl-4-hydroxy-6-methylphenyl-1-(1-methylethylidine)]benzene; 4,4'-biphenol; 2,2',6,8-tetramethyl-3,3',5,5'-tetrabromo-4,4'-biphenol; 2,2',6,6'-tetramethyl-3,3',5-tribromo-4,4'-biphenol; 1,1-bis(4-hydroxyphenyl)-2,2,2-trichloroethane; 2,2-bis(4-hydroxyphenyl-1,1,1,3,3,3-hexafluoropropane); 1,1-bis (4-hydroxyphenyl)-1-cyanoethane; 1,1-bis(4-hydroxyphenyl)dicyanomethane; 1,1-bis(4-hydroxyphenyl)-1-cyano-1-phenylmethane; 2,2-bis(3-methyl-4-hydroxyphenyl)propane; 1,1-bis(4-hydroxyphenyl)norbornane; 9,9-bis(4-hydroxyphenyl)fluorene; 3,3-bis(4-hydroxyphenyl)phthalide; 1,2-bis(4-hydroxyphenyl)ethane; 1,3-bis(4-hydroxyphenyl)propenone; bis(4-hydroxyphenyl)sulfide; 4,4'-oxydiphenol; 4,4-bis(4-hydroxyphenyl)pentanoic acid; 4,4-bis(3,5-dimethyl-4-hydroxyphenyl)pentanoic acid; 2,2-bis(4-hydroxyphenyl) acetic acid; 2,4'-dihydroxydiphenylmethane; 2-bis(2-hydroxyphenyl)methane; bis(4-hydroxyphenyl)methane;

bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3'-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl) propane; 2,2-bis(3,5-dichloro-4-hydroxyphenyl)propane; 2,2-bis(3,5-dibromo-4-hydroxyphenyl)propane 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,2,5,6-tetrabromophenyl)propane; 2,2-bis(4-hydroxy-2,3,5,6-tetramethylphenyl)propane; 2,2-bis(2,6-dichloro-1,3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl)cyclohexylmethane; 2,2-bis(4-hydroxyphenyl)-1-phenylpropane; 1,1-bis(4-hydroxyphenyl)cyclohexane;1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 4,4'-[1-methyl-4-(1-methylethyl)-1,3-cyclohexandiyl]bisphenol (1,3BHPM); 4-[1-[3-(4-hydroxyphenyl)-4-methylcyclohexyl]-1-methyl-ethyl]-phenol (2,8 BHPM); 3,8-dihydroxy-5a, 10b-diphenylcoumarano-2',3',2,3-coumarane (DCBP); 2-phenyl-3,3-bis-(4-hydroxyphenyl)phthalimidine; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-t-butyl-5-chloro-1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,-tetrachloromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethycyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis-4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3.3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol; 4,4'-bis(3,5-dimethyl)diphenol; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; resorcinol; $C_{1-3}$ alkyl-substituted resorcinols; 3-(4-hydroxyphenyl)-1,1,3-trimethylindan-5-ol; 1-4-hydroxyphenyl)-1,3,3-trimethylindan-5-ol; 4,4-dihydroxydiphenyl ether; 4,4-dihydroxy-3,3-dichlorodiphenylether; 4,4-dihydroxy-2,5-dihydroxydiphenyl ether; 4,4-thiodiphenol; 2,2,2',2'-tetrahydro-3,3,3,3 tetramethyl-1,1'-spirobi[1H-indene]-6,6'-diol; and mixtures thereof.

7. The polymer composition of claim 1, wherein said second resin further comprises structural units of the formula VII,

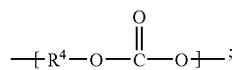

in which $R^4$ is an $C_2$–$C_{50}$ aliphatic, $C_3$–$C_{50}$ cycloaliphatic, or a $C_4$–$C_{40}$ aromatic radical, wherein at least about 60 percent of the total number of $R^4$ groups are aromatic radicals.

8. The polymer composition of claim 7, wherein $R^4$ is an aromatic organic radical of the formula VIII,

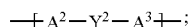 VIII wherein each of $A^2$ and $A^3$ is a $C_3$–$C_{10}$ monocyclic divalent aromatic radical and $Y^2$ is a $C_1$–$C_{10}$ aliphatic radical having one or two atoms which separate $A^2$ from $A^3$, or a $C_3$–$C_{10}$ cycloaliphatic radical having one or two atoms which separate $A^2$ from $A^3$.

9. The polymer composition of claim 1, wherein the second resin further comprises structural units of the formula IX,

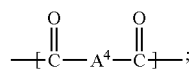 IX wherein $A^4$ is a $C_1$–$C_{40}$ aliphatic radical.

10. The polymer composition of claim 9, wherein the structural units of formula IX are derived from a compound of formula X,

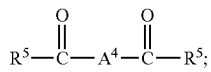 X wherein $A^4$ is a $C_1$–$C_{40}$ aliphatic radical, and $R^5$ is independently at each occurrence a hydroxyl, halogen or $C_7$–$C_{12}$ aryloxy group, or $C_7$–$C_{12}$ alkaryloxy group.

11. The polymer composition of claim 10, wherein the compound of formula X is selected from the group consisting of decanedioic, undecanedioic acid, dodecanedioic, sebacic acid, adipic acid, suberic acid, oleic acid, azelaic acid, erucaic acid, brazzylic acid, isophthalic acid, terephthalic acid, malonic acid, malic acid, maleic acid, lactic acid, naphthalene 2,6-dicarboxylic acid, naphthalene 2,7-dicarboxylic acid, cyclohexane-1,4-dicarboxylic acid, biphenyl-3,4'-dicarboxylic acid biphenyl-4,4'-dicarboxylic acid, diphenylether-4,4'-dicarboxylic acid, diphenylsulfone-4,4'-dicarboxylic acid, diphenylketone-4,4dicarboxylic acid, diphenylsulfide-4,4'-dicarboxylic acid, diphenylmethane-4,4'-dicarboxylic acid, diphenyldichloromethane-4,4'-dicarboxylic acid, their corresponding diacid halides, diesters, acid esters, and mixtures thereof.

12. The polymer composition of claim 1 wherein, at least one of the first and second resins further comprises structural units having formula XI,

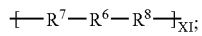

wherein, $R^6$ is a $C_2$–$C_{1000}$ aliphatic radical, or a $C_4$–$C_{1000}$ cycloaliphatic radical; and $R^7$ and $R^8$ each independently at each occurrence represent

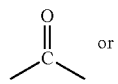 or 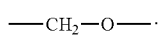

13. The polymer composition of claim 12, wherein structural units of formula XI are derived from at least one of polyethylene glycol, polypropylene glycol, polybutylene glycol, polytetrahydrofuran diol, and polycaprolactone diol.

14. The polymer composition of claim 1, wherein the first resin comprising structural units of formula I is characterized by a polyarylate block length corresponding to a formula weight of from about 500 to about 15000 grains/mole as measured by gel permeation chromatography using one or more polycarbonate molecular weight standards.

15. The polymer composition of claim 1, further comprising a third resin.

16. The polymer composition of claim 15 wherein said third resin is selected from the group consisting of polyamides, polyesters, polycarbonates, olefin polymers, polystyrene, polyethylene, polysiloxanes, polysilane, polysulfones and poly tetrafluoro ethylene.

17. A polymer composition comprising:
a transparent polymer blend, said transparent polymer blend comprising;
(a) a first ITR resin, said first resin comprising polyarylate structural units V,

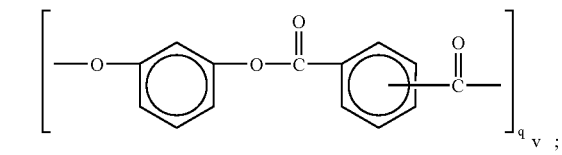

wherein q=2–400; and
(b) a second ITR resin, said second ITR resin comprising polyarylate structural units V, said polyarylate structural units being present in an amount corresponding to a mole percentage of the total number of molar repeat units of said first ITR resin and a mole percentage of the total number of molar repeat units of said second ITR resin;
said first ITR resin and said second ITR resin being characterized by a difference in polyarylate structural unit content, said difference being about 9 to about 40 mole percent.

18. The polymer composition of claim 17, wherein said second resin comprises polycarbonate structural units.

19. The polymer composition of claim 18, wherein said second resin, comprises bisphenol-A polycarbonate structural units.

20. The polymer composition of claim 17, wherein said blend has a percent light transmittance of greater than or equal to 60% as measured in accordance with ASTM D1003.

21. The polymer composition of claim 20, said blend having a haze value of less than or equal to 40% as measured in accordance with ASTM D1003.

22. The polymer composition of claim 17, further comprising at least one colorant, at least one filler, at least one fire retardant, at least one UV stabilizer, at least one antistatic agent, at least one acid scavenger or at least one visual effect enhancer.

23. An article comprising the polymer composition of claim 1.

24. An article comprising the polymer composition of claim 17.

* * * * *